(12) United States Patent
Louis

(10) Patent No.: US 12,145,712 B2
(45) Date of Patent: Nov. 19, 2024

(54) HIGH-ALTITUDE WIND TURBINE AIRCRAFT SYSTEM AND METHOD OF USE

(71) Applicant: Herns Louis, Moreno Valley, CA (US)

(72) Inventor: Herns Louis, Moreno Valley, CA (US)

( * ) Notice: Subject to any disclaimer, the term of this patent is extended or adjusted under 35 U.S.C. 154(b) by 81 days.

(21) Appl. No.: 18/307,139

(22) Filed: Apr. 26, 2023

(65) Prior Publication Data

US 2023/0365244 A1 Nov. 16, 2023

Related U.S. Application Data

(60) Provisional application No. 63/341,111, filed on May 12, 2022.

(51) Int. Cl.
| | |
|---|---|
| *B60L 8/00* | (2006.01) |
| *B60L 50/60* | (2019.01) |
| *B64B 1/34* | (2006.01) |
| *F03D 9/11* | (2016.01) |
| *F03D 9/32* | (2016.01) |
| *H01M 10/44* | (2006.01) |
| *H01M 10/46* | (2006.01) |
| *H02K 7/18* | (2006.01) |

(52) U.S. Cl.
CPC .............. *B64B 1/34* (2013.01); *B60L 8/006* (2013.01); *B60L 50/60* (2019.02); *F03D 9/11* (2016.05); *F03D 9/32* (2016.05); *F03D 9/322* (2023.08); *H01M 10/44* (2013.01); *H01M 10/46* (2013.01); *H02K 7/183* (2013.01); *B60L 2200/10* (2013.01); *B60L 2210/30* (2013.01); *F05B 2240/92* (2013.01); *H01M 2220/20* (2013.01)

(58) Field of Classification Search
CPC ........ B64B 1/34; B60L 8/006; B60L 2200/10; B60L 2210/30; F03D 9/11; F03D 9/32; F03D 9/322; H02K 7/183; F05B 2240/92; H01M 2220/20; H01M 10/44; H01M 10/45

See application file for complete search history.

(56) References Cited

U.S. PATENT DOCUMENTS

| | | | |
|---|---|---|---|
| 4,085,709 | A | 4/1978 | Tangri |
| 6,119,651 | A | 9/2000 | Anderson |
| 6,568,633 | B2 | 5/2003 | Dunn |
| 7,608,011 | B2 | 10/2009 | Grabowski |
| 2002/0005454 | A1 | 1/2002 | MacCready |

(Continued)

*Primary Examiner* — Christopher M Koehler
*Assistant Examiner* — Thomas K Quigley
(74) *Attorney, Agent, or Firm* — Brennan, Manna & Diamond, LLC

(57) ABSTRACT

The present invention relates to a high-altitude wind farm aircraft system. The aircraft has a plurality of wind turbines for capturing wind energy and converting same into electric energy which is stored in an onboard battery system. The electric energy, before storage, is stepped down by a transformer and converted into DC by an AC-DC converter. For use of the stored energy, the aircraft is brought to the ground and the batteries are removed to connect to a microgrid or any other electric circuit. The batteries can be installed again in the aircraft system for recharging with the aircraft going to high altitude for recharging the batteries. In one embodiment, the aircraft has an altitude indicator for indicating an appropriate altitude level for maximum efficiency of the system.

20 Claims, 5 Drawing Sheets

(56) References Cited

U.S. PATENT DOCUMENTS

| | | | |
|---|---|---|---|
| 2002/0070313 A1* | 6/2002 | MacCready | B64U 50/32 244/5 |
| 2003/0141409 A1* | 7/2003 | Lisoski | B64U 10/25 244/13 |
| 2006/0091256 A1* | 5/2006 | Palmer | B64B 1/30 244/97 |
| 2006/0289213 A1 | 12/2006 | Cervantes | |
| 2008/0048453 A1* | 2/2008 | Amick | F03D 1/04 290/55 |
| 2010/0001534 A1* | 1/2010 | Kim | F03D 9/008 290/55 |
| 2010/0314886 A1* | 12/2010 | Potter | F03D 13/20 244/33 |
| 2011/0101692 A1* | 5/2011 | Bilaniuk | F03D 13/20 290/55 |
| 2011/0267241 A1* | 11/2011 | Grimm | H01Q 1/246 244/30 |
| 2012/0138733 A1* | 6/2012 | Hiebl | B64B 1/58 244/30 |
| 2012/0312918 A1* | 12/2012 | Heppe | B64B 1/00 244/30 |
| 2013/0285385 A1* | 10/2013 | Zohar | F03D 1/04 290/55 |
| 2014/0103158 A1* | 4/2014 | Berry | B64C 29/0025 244/12.1 |
| 2014/0374537 A1* | 12/2014 | Anderson | G01W 1/08 244/33 |
| 2015/0021442 A1* | 1/2015 | Hunter | B64D 27/24 244/53 R |
| 2016/0311529 A1* | 10/2016 | Brotherton-Ratcliffe | B64D 35/06 |
| 2016/0325834 A1* | 11/2016 | Foster | B64U 50/34 |
| 2017/0110883 A1* | 4/2017 | Tabe | F03B 13/26 |
| 2018/0022461 A1* | 1/2018 | Nunes | B64D 27/24 244/26 |
| 2018/0050797 A1* | 2/2018 | Palmer | B64B 1/12 |
| 2018/0346118 A1* | 12/2018 | Frolov | B64D 27/24 |
| 2020/0116130 A1* | 4/2020 | Baun | F03D 13/20 |
| 2020/0378356 A1* | 12/2020 | Baun | H02J 3/381 |
| 2022/0144405 A1* | 5/2022 | Brutoco | B64B 1/12 |
| 2023/0227157 A1* | 7/2023 | Choi | F03D 3/005 244/17.23 |
| 2023/0250805 A1* | 8/2023 | Choi | G05D 1/678 |
| 2023/0347784 A1* | 11/2023 | Foland | G08G 5/0021 |
| 2023/0382270 A1* | 11/2023 | Pill | B64D 13/08 |
| 2023/0399115 A1* | 12/2023 | Anderson | B64D 27/02 |
| 2023/0407842 A1* | 12/2023 | Sia | B64U 10/50 |

* cited by examiner

HIGH-ALTITUDE WIND TURBINE AIRCRAFT SYSTEM AND METHOD OF USE

CROSS-REFERENCE TO RELATED APPLICATION

The present application claims priority to, and the benefit of, U.S. Provisional Application No. 63/341,111, which was filed on May 12, 2022, and is incorporated herein by reference in its entirety.

FIELD OF THE INVENTION

The present invention relates generally to the field of aircrafts and wind turbine systems. More specifically, the present invention relates to a novel aircraft system equipped with a plurality of wind turbines configured to capture wind energy at high altitudes and convert into electric energy. The electric energy is stored in a plurality of batteries retained inside the aircraft and can be easily removed for supplying energy when the aircraft is back onto the ground. The aircraft system enables wind energy capture at high altitude environments to convert into electric energy. Accordingly, the present disclosure makes specific reference thereto. Nonetheless, it is to be appreciated that aspects of the present invention are also equally applicable to other like applications, devices, and methods of manufacture.

BACKGROUND

By way of background, wind energy is an important source of renewable energy that can be captured and used for generating electricity. The need for wind energy arises from several factors, including the increasing demand for electricity worldwide, the environmental impact of traditional energy sources such as coal (i.e., fossil fuels), and the desire for greater energy security and independence. One of the primary benefits of wind energy is that it is a clean and renewable source of electricity. Unlike fossil fuels, which release greenhouse gases and contribute to climate change, wind energy does not produce harmful emissions or pollutants.

However, traditional wind turbines are installed near earth's surface and have location dependency. Speed and frequency of wind near earth's surface is less consistent and less predictable making it difficult to generate a reliable and consistent supply of electricity. Further, conventional wind turbines can be large and visually intrusive, which can be a concern for communities and wildlife. They can also generate noise pollution, which can be a nuisance for nearby residents. Furthermore, conventional wind turbines can pose a risk to wildlife, particularly birds and bats, which can collide with the spinning blades. This can have a negative impact on local ecosystems. Conventional wind turbines are costly to install and require a significant amount of land to operate, which can be a challenge in densely populated areas. Off-shore wind turbines can have a detrimental effect on marine life during construction and operation.

Stronger and more consistent winds can be found at higher altitudes relative to earth which is not yet captured by conventional windmills systems for electricity generation. As a result, there is a need for a new kind of wind energy system that could tap into the stronger, more consistent wind currents found at higher altitudes while overcoming the challenges associated with the current windmills systems.

Therefore, there exists a long-felt need in the art for a high-altitude wind power system that captures and uses wind blowing in higher altitudes for generating electricity. There is also a long-felt need in the art for an improved electricity generating system or electricity generator that is an alternative to conventional wind turbine systems. Additionally, there is a long-felt need in the art for a wind power system that provides a more reliable, efficient, and environmentally friendly way to harness the power of the wind for generating electricity. Moreover, there is a long-felt need in the art for a wind energy electricity generating system that does not contribute to the noise or visual pollution typically associated with traditional wind turbines. Further, there is a long-felt need in the art for a wind power system that uses an airborne aircraft system equipped with a plurality of wind turbines and batteries for generating and storing electric energy. Finally, there is a long-felt need in the art for a high-altitude wind power system that captures wind energy at higher altitudes using an aircraft having turbines and onboard battery storage units.

The subject matter disclosed and claimed herein, in one embodiment thereof, comprises a multifunctional wind farm aircraft system for capturing wind energy in high altitude environments and converting same into electric energy for use on the ground with microgrids and other electric appliances. The aircraft system further features a plurality of rotor wings for helping and maintaining lift of the aircraft when hovering or maneuvering, a plurality of wind turbines are internally connected to an onboard electricity generating (i.e., generator) and storage system for capturing wind energy and converting into electricity. The onboard electricity generating, and storage system includes a plurality of batteries for storing electric energy and a converter for converting AC produced by the wind turbines into DC for storing in the batteries. The aircraft can also be used for carrying cargo in addition to storing electric energy.

In this manner, the high-altitude wind power aircraft system of the present invention accomplishes all of the foregoing objectives and provides users with an airborne wind farm aircraft system capable of harnessing and storing wind energy via onboard battery storage units. The system offers an alternative to wind turbines that capture energy at higher altitudes rather than on or near ground level. The batteries are configured to be removed once the craft is back at ground level and utilized as a power source.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multifunctional wind farm aircraft system. The aircraft system is designed for capturing wind energy in high altitude environments to convert into electric energy. The aircraft system further comprises a housing of a lightweight, durable rigid structure made of ultra-light aluminum and carbon fiber materials; a plurality of rotor wings positioned on the housing for helping and maintaining lift of the aircraft when hovering or maneuvering; a plurality of wind turbines disposed on the housing and internally connected to an onboard electricity generating and storage system for capturing wind energy and converting it into electricity. The onboard electricity generating, and storage system includes a plurality of batteries for storing electric energy and a converter for converting AC produced by the wind turbines into DC for storing in the batteries. It is to be appreciated that the aircraft can be in the form of an airship, blimp, or air balloon.

In yet another embodiment, an aircraft with a plurality of wind turbines and an onboard electricity generating and storage system is disclosed. The aircraft is used for converting wind energy at high altitudes into electric energy. The onboard electricity generating and storage system includes a plurality of batteries configured for storing electric energy, an alternating current (AC) to direct current (DC) converter being used for converting the AC into DC for storage in the batteries, a constant step-down AC transformer for suppling low voltage AC to the converter, a processor constantly monitors the battery's storage levels and electric supply from the wind turbines and an altitude indicator indicating an altitude for the aircraft for maximum efficiency of the wind turbines and the onboard electricity generating and storage system.

In yet another embodiment, batteries are removable from the aircraft and are configured to connect to one or more microgrid loads for providing electric power wherein an inverter is connected to the batteries for converting the stored DC into AC of an appropriate power.

In yet another embodiment, a method for operating an airborne wind farm aircraft with an onboard electricity generating and storage system is described. The method includes the steps of lifting the aircraft to a desired altitude level where a constant wind is flowing; converting wind energy into electrical energy using a plurality of wind turbines disposed on a housing of the aircraft; transmitting the electric current produced by the plurality of windmills to an AC to DC converter via a transformer; storing the electric energy in the battery system; removing the battery system from the aircraft and connecting it to a microgrid on ground for providing electric energy and positioning the battery system inside the aircraft for recharging and sending the aircraft back to the high-altitude environment.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
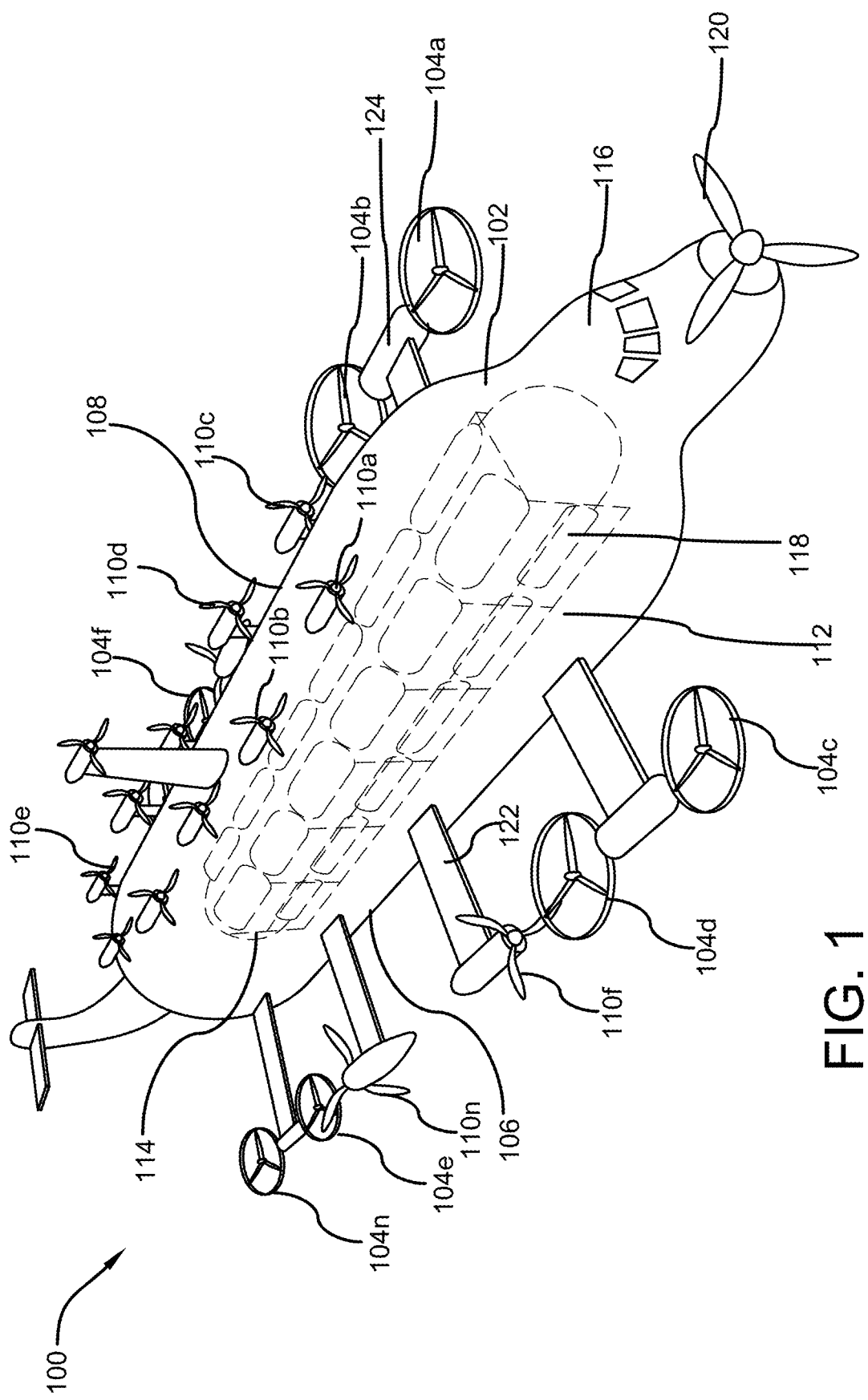
FIG. 1 illustrates a perspective view of one potential embodiment of an airborne wind farm aircraft of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a high-altitude wind power system that uses wind blowing in higher altitudes for generating electricity. There is also a long-felt need in the art for an improved electricity generating system that is an alternative to conventional wind turbine systems. Additionally, there is a long-felt need in the art for a wind power system that provides a more reliable, efficient, and environmentally friendly way to harness the power of the wind for generating electricity. Moreover, there is a long-felt need in the art for a wind energy electricity generating system that does not contribute to the noise or visual pollution typically associated with traditional wind turbines. Further, there is a long-felt need in the art for a wind power system that uses an airborne aircraft system equipped with a plurality of wind turbines and batteries for generating and storing electric energy. Finally, there is a long-felt need in the art for a high-altitude wind power system that captures wind energy at higher altitudes using an aircraft having turbines and onboard battery storage units.

The present invention, in one exemplary embodiment, is a method for operating an airborne wind farm aircraft with an onboard electricity generating and storage system. The method includes the steps of lifting the aircraft to a desired altitude level or elevation where a constant wind is flowing; converting wind energy into electrical energy using a plurality of wind turbines disposed on the housing of the aircraft; transmitting the electric current produced by the plurality of windmills to an AC to DC converter via a transformer; storing the electric energy in the battery system; removing the battery system from the aircraft and connecting it to a microgrid on the ground for providing electric energy and positioning the battery system inside the aircraft for recharging and sending the aircraft back to the high-altitude environment.

Figure 2:
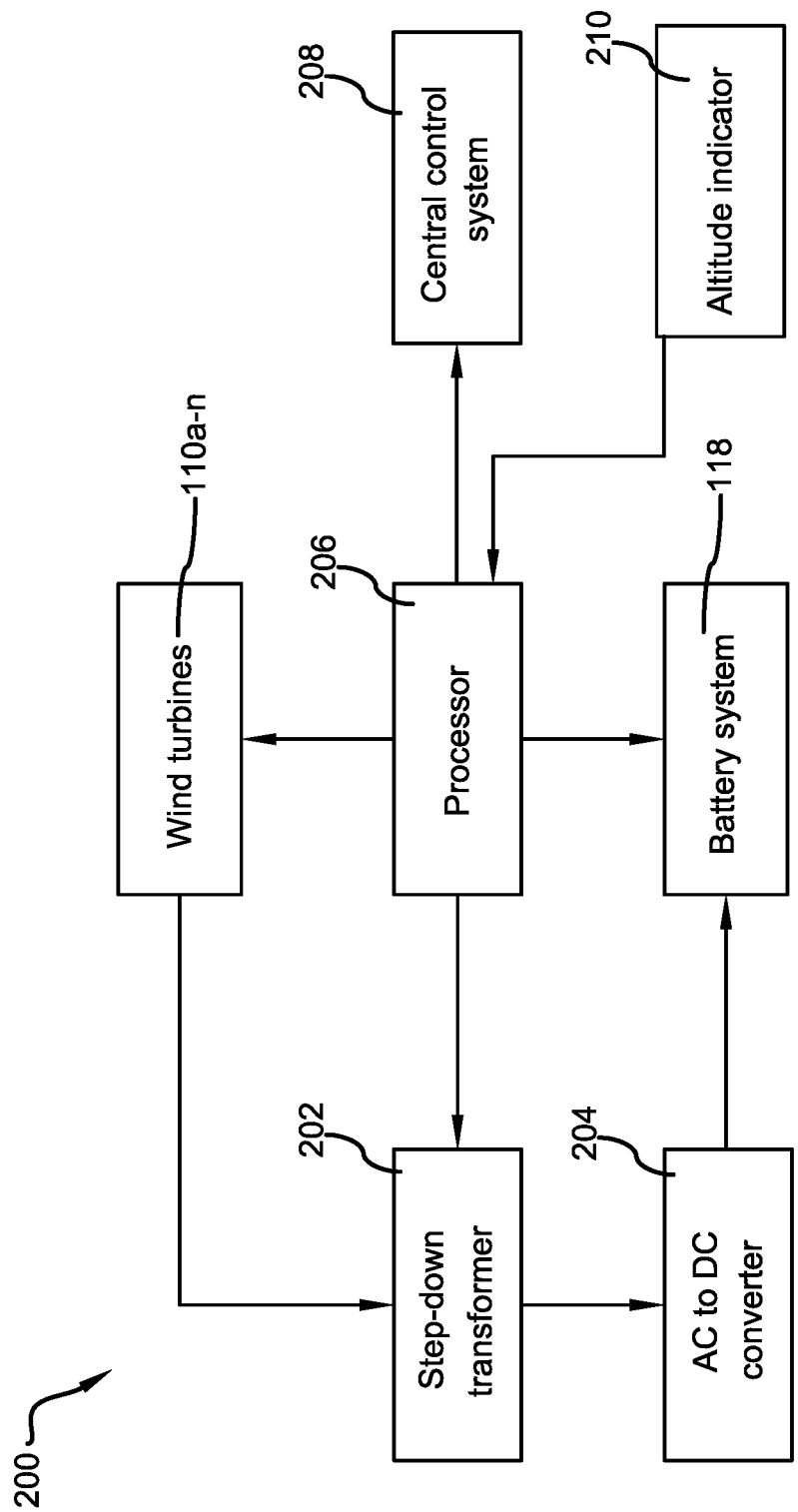
FIG. 2 illustrates a schematic view of the onboard electricity generating (i.e., generator) and storage system used in the airborne wind farm aircraft of the present invention in accordance with the disclosed architecture.

Referring initially to the drawings, FIG. 1 illustrates a perspective view of one potential embodiment of an airborne wind farm aircraft of the present invention in accordance with the disclosed architecture. The airborne wind farm aircraft or airship 100 of the present invention is designed as a multifunctional rigid airship for capturing wind energy in high altitude environments and converting same into electricity for storage using an onboard electricity generating and storage system as illustrated in FIG. 2. The rigid structure 102 is lightweight, durable, and made of ultra-light aluminum and carbon fiber materials. It is to be appreciated that the aircraft or airship 100 can be in the form of a high-altitude airship, blimp, or air balloon. More specifically, the aircraft or airship 100 has a plurality of rotor wings 104a-n positioned on opposing longitudinal sides 106, 108 for helping and maintaining lift of the aircraft or airship 100 when hovering or maneuvering. For capturing wind energy, a plurality of windmills 110a-n, which can include one or both of horizontal-axis turbines and vertical-axis turbines, are positioned along the aircraft or airship 100. The windmills 110a-n are internally connected to the onboard electricity generating (i.e., generator) a storage system for capturing wind energy and converting same into electricity.

In one exemplary embodiment, the housing 102 has a fuselage 112 having an integrated transverse bulkhead 114 that helps in reinforcement with high strength composite tensioned cables. The aircraft or airship 100, similar to conventional aircrafts, can have a cockpit 116 and aircraft or the airship 100 can be manually operated by a pilot or can be in autonomous operation. The aircraft or airship 100 has high endurance and captures wind energy in high altitude for example, between about 22,000-40,000 meters. Embodiments of the high-altitude airborne aircraft or airship 100 is configured to store electrical energy converted from the collected wind energy in a plurality of battery units 118. In some embodiments, a portion of the stored electrical energy can also be used for providing energy to the propeller 120 of the aircraft or airship 100.

The rotor wings 104a-n are preferably attached to the protrusions 122, 124 extending from the longitudinal sides 106, 108 and work in conjunction with the propeller for providing a long time of flight of the aircraft or airship 100. The battery units 118 are removably positioned inside the aircraft or airship 100 and can be removed when the aircraft or airship 100 returns to the earth's surface, enabling users to use the battery units 118 for providing electrical power. In one exemplary embodiment, the aircraft or airship 100 of the present embodiment is designed not to carry any cargo and is designed to only store electric energy converted from wind power at high altitudes.

FIG. 2 illustrates a schematic view of the onboard electricity generating and storage system 200 used in the airborne wind farm aircraft or airship 100 of the present invention in accordance with the disclosed architecture. As illustrated, the system 200 includes a plurality of batteries 118, each battery is configured for storing electric energy. The batteries 118 can be any of Li-Ion batteries, Lead-acid batteries, Flow batteries, and more. It should be noted that the batteries 118 function as an electric grid for storing electric energy. The wind turbines 110a-n installed on the aircraft or airship 100 produce alternating current (AC) and an AC to direct current (DC) converter 204 is used for converting the AC into DC for storage in the batteries 118. The converter 204 receives AC from a step-down transformer 202 which steps down the electricity produced by the windmills 110a-n. The transformer 202 is configured to receive current from all the individual wind turbines 110a-n and provides a constant step-down AC supply to the inverter 204. The DC current from the inverter 204 is stored in the batteries 118.

The system 200 also has a processor 206 for monitoring the system 100 and is further connected to the central control system 208 of the aircraft or airship 100. The processor 206 constantly monitors the battery's storage level and electric supply from the windmills 110a-n and notifies the central control system 208 when the battery system 118 is completely charged. It is useful as the central control system 208 can initiate movement of the aircraft or airship 100 toward the ground. An altitude indicator 210 indicates an altitude at which a desired wind speed for maximum efficiency of the windmills 110a-n and the onboard electricity generating and storage system 200.

Figure 3:
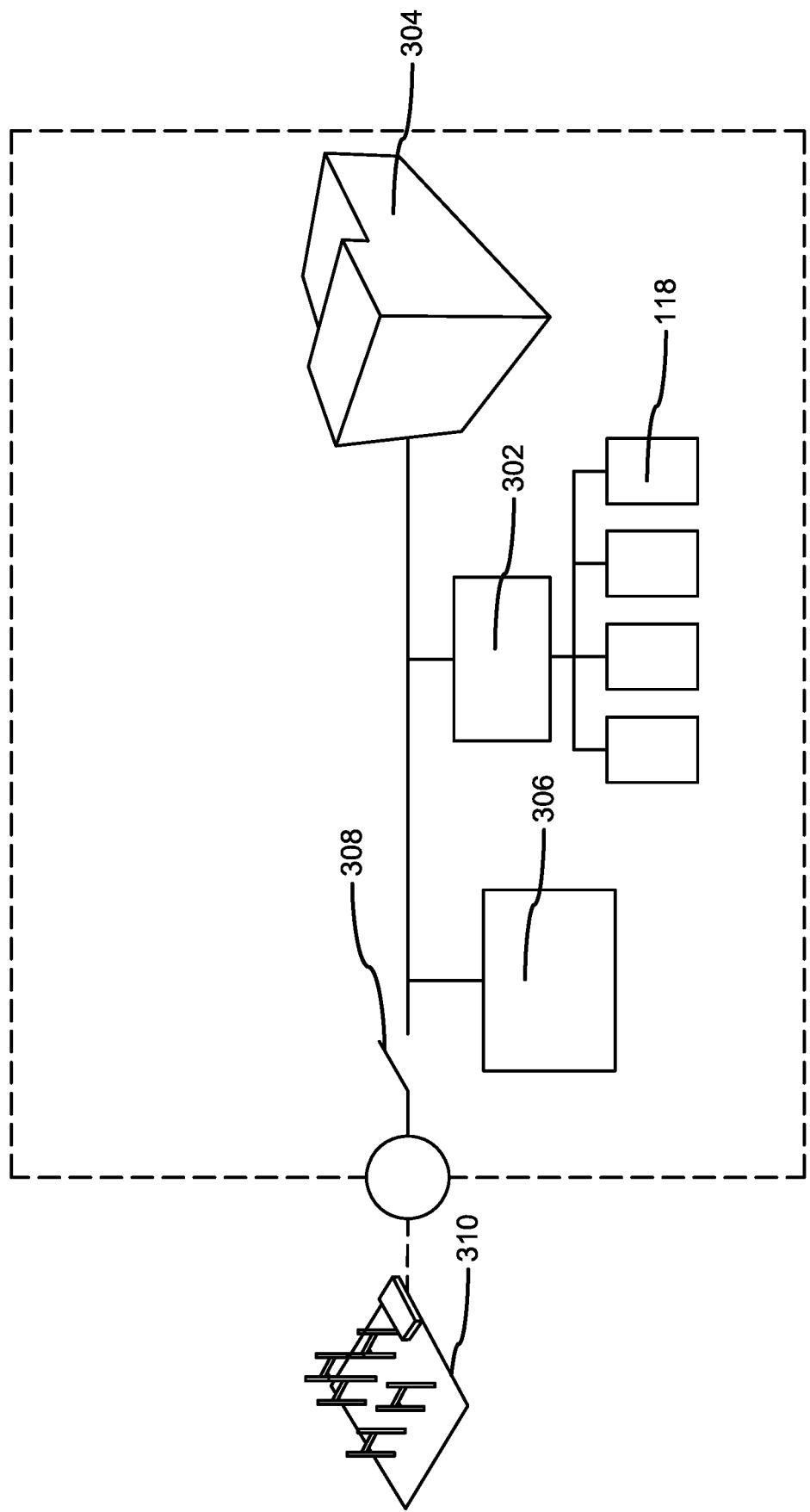
FIG. 3 illustrates a perspective view showing an exemplary microgrid powered by the battery system used in the airborne wind farm aircraft independently of an electric grid substation in accordance with the disclosed architecture.

FIG. 3 illustrates a perspective view showing an exemplary microgrid powered by the battery system 118 used in the airborne wind farm aircraft or airship 100 independently of an electric grid substation in accordance with the disclosed architecture. The battery system 118 is removable from the aircraft or airship 100 and utilized as an alternative power source by electric utility companies and the like on the ground. As illustrated, the battery system 118 is connected to an on-ground battery inverter or converter 302 for converting the DC stored in the battery system 118 to alternating current (AC) for supplying to microgrid loads 304. The battery inverter or converter 302 is specially designed to work with the battery system 118 and further, regulates the voltage and frequency of the output AC power, for protecting the microgrid loads 304 from power surges and other electrical problems.

A microgrid controller 306 controls the overall operation of the microgrid 300 and helps in automatic connection with an isolation device 308 that connects the microgrid loads 304 to a backup power source 310, such as an electric grid substation. It should be appreciated that the battery system 118 can be designed to store different levels of electric energy to meet different requirements of users.

Figure 4:
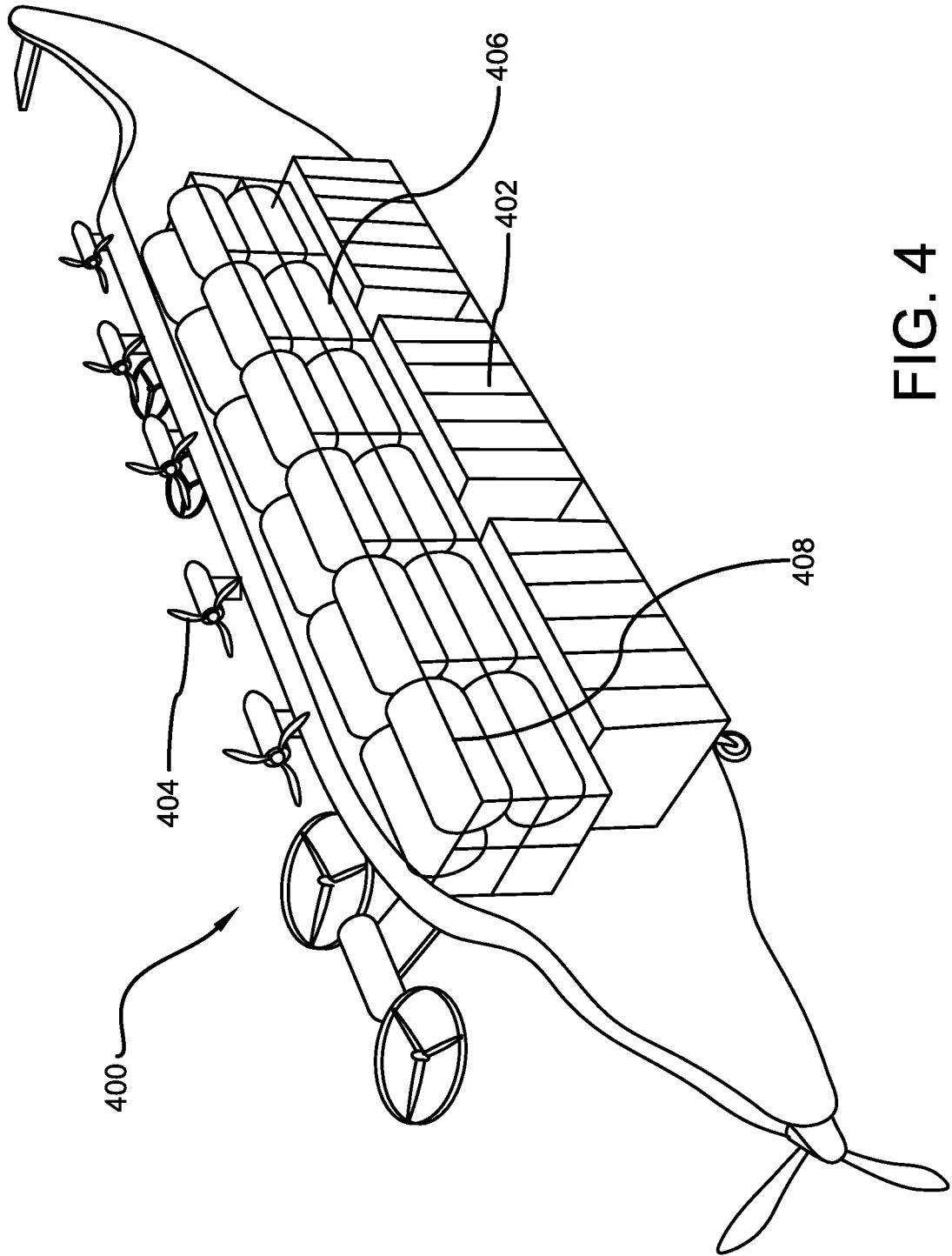
FIG. 4 illustrates a cross-sectional view of another embodiment of the airborne wind farm aircraft system of the present invention in accordance with the disclosed architecture.

FIG. 4 illustrates a cross-sectional view of another embodiment of the airborne wind farm aircraft system of the present invention in accordance with the disclosed architecture. In the present embodiment, the aircraft 400 is designed to transport cargo 402, in addition to provide the functionality of storing electrical energy converted from the wind energy. The aircraft 400 has a plurality of wind turbines 404 and has the battery system 406 for storing energy.

The system 200 can be implemented in the same manner in the aircraft 400 for converting the wind energy into electrical energy for storage in the battery system 406. In the aircraft 400, bulkhead 408 is positioned in a portion of the aircraft 400 for storing the batteries 406. The aircraft 400 can be designed to have better aerodynamic stability for storing cargo 402 while storing electric power.

Figure 5:
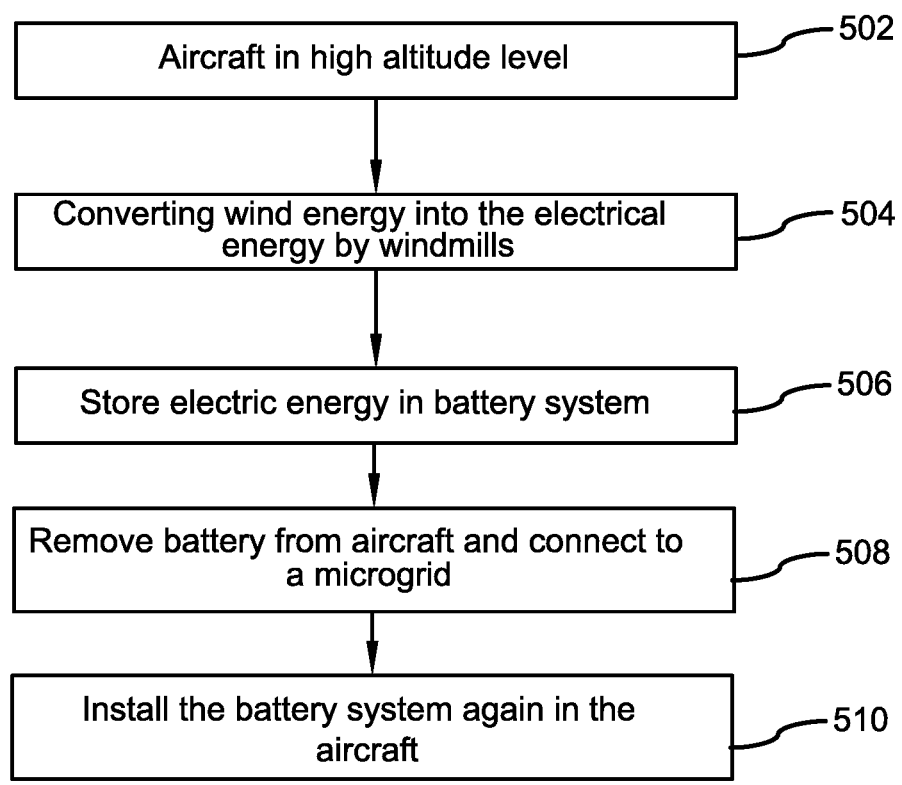
FIG. 5 illustrates a flow diagram depicting a process of use of the high-altitude wind power system of different embodiments of the present invention in accordance with the disclosed architecture.

FIG. 5 illustrates a flow diagram depicting a process of use of the high-altitude wind power system of different embodiments of the present invention in accordance with the disclosed architecture. Initially, the aircraft is lifted to a desired altitude level where a constant wind is flowing (Step 502). The aircraft can be operated by an onboard pilot or can be an autonomous aircraft. Then, the windmills disposed on the aircraft convert wind energy into the electrical energy like conventional windmills (Step 504). The plurality of the windmills use the flowing wind and individually produce electric current which is transmitted to the AC to DC converter via the transformer. Then, the electric energy is stored in the battery system and the aircraft is brought to the ground (Step 506).

For providing the electric energy to a microgrid on the ground, the battery system is removed from the aircraft and is connected to the microgrid (Step 508). Finally, the battery system is again positioned inside the aircraft for recharging and the aircraft is sent back to the high-altitude environment (Step 510).

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "airborne wind farm aircraft", "airship", "aircraft", "device", and "wind farm aircraft system" are interchangeable and refer to the high-altitude wind power system 100, 400 of the present invention.

Notwithstanding the foregoing, the high-altitude wind power system 100, 400 of the present invention can be of any suitable size and configuration as is known in the art without affecting the overall concept of the invention, provided that it accomplishes the above-stated objectives. One of ordinary skill in the art will appreciate that the high-altitude wind power system 100, 400 as shown in the FIGS. are for illustrative purposes only, and that many other sizes and shapes of the high-altitude wind power system 100, 400 are well within the scope of the present disclosure. Although the dimensions of the high-altitude wind power system 100, 400 are important design parameters for user convenience, the high-altitude wind power system 100, 400 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An airborne wind farm aircraft comprising:
   a high-altitude airship having a plurality of rotor wings mounted on an exterior of opposing sides of said high-altitude airship for maintaining lift of said high-altitude airship, and a plurality of windmills mounted on said exterior of opposing sides of said high-altitude airship for capturing wind energy;
   an onboard electricity generator for converting said wind energy into electricity;
   an onboard battery storage system for storing said electricity;
   wherein said high-altitude airship having an aluminum and carbon fiber frame;
   wherein said plurality of windmills having horizontal-axis turbines and vertical-axis turbines;
   wherein said capturing wind energy is at an altitude of between 22,000 meters and 40,000 meters; and
   further wherein said onboard battery storage system having a plurality of battery units.

2. The airborne wind farm aircraft of claim 1, wherein said high-altitude airship having a housing, a fuselage, and an integrated transverse bulkhead including high strength composite tensioned cables.

3. The airborne wind farm aircraft of claim 2, wherein said high-altitude airship having a cockpit for selectively manual or autonomous operation.

4. The airborne wind farm aircraft of claim 1, wherein said high-altitude airship is an air balloon.

5. The airborne wind farm aircraft of claim 1, wherein said high-altitude airship is a blimp.

6. The airborne wind farm aircraft of claim 1, wherein a portion of said stored electrical energy used for providing energy to said high-altitude airship.

7. The airborne wind farm aircraft of claim 2, wherein said plurality of rotor wings attached to protrusions extending outward from said opposing sides of said high-altitude airship.

8. The airborne wind farm aircraft of claim 7, wherein said plurality of battery units selectively removable from said fuselage when said high-altitude airship is on the earth's surface.

9. The airborne wind farm aircraft of claim 8, wherein said plurality of battery units are selected from a group of Li-Ion batteries, Lead-acid batteries, and Flow batteries.

10. The airborne wind farm aircraft of claim 9, wherein turning of said plurality of windmills produce alternating current (AC).

11. The airborne wind farm aircraft of claim 10 further comprising a converter for converting said AC current to direct current (DC) for storing of said electrical energy.

12. The airborne wind farm aircraft of claim 11, wherein said converter receives said AC current from a step-down transformer for stepping down said electrical energy from said plurality of windmills.

13. The airborne wind farm aircraft of claim 12, wherein said step-down transformer configured to receive said AC current and provides a constant step-down AC supply to said converter.

14. The airborne wind farm aircraft of claim 13 further comprising an altitude indicator for indicating an altitude of said high-altitude airship.

15. The airborne wind farm aircraft of claim 14 further comprising a wind speed indicator for tracking wind speed at said altitude.

16. An airborne wind farm aircraft comprising:
   a high-altitude airship having a plurality of rotor wings mounted on an exterior of opposing sides of said high-altitude airship for maintaining lift of said high-altitude airship, and a plurality of windmills mounted on said exterior of opposing sides of said high-altitude airship for capturing wind energy;
   an onboard electricity generator for converting said wind energy into electricity;
   an onboard battery storage system for storing said electricity;

wherein said high-altitude airship having an aluminum and carbon fiber frame;
wherein said plurality of windmills having horizontal-axis turbines and vertical-axis turbines; and
further wherein said high-altitude airship is an air balloon.

17. The airborne wind farm aircraft of claim 16 wherein said capturing wind energy is at an altitude of between 22,000 meters and 40,000 meters, and further wherein said onboard battery storage system having a plurality of battery units.

18. A method for capturing wind energy from a high-altitude aircraft, the method comprising the steps of:
providing a high-altitude airship having a plurality of rotor wings mounted on an exterior of opposing sides of said high-altitude airship for maintaining lift of said high-altitude airship, and a plurality of windmills mounted on said exterior of opposing sides of said high-altitude airship for capturing wind energy;
elevating said high-altitude airship to a high altitude;
converting said wind energy into electricity with an onboard electricity generator; and
storing said electricity with an onboard battery storage system, wherein said plurality of windmills having horizontal-axis turbines and vertical-axis turbines, wherein said high-altitude airship is an air balloon, and further wherein said capturing wind energy is at an altitude of between 22,000 meters and 40,000 meters.

19. The method of capturing wind energy of claim 18 further comprising a step of measuring an altitude of said high-altitude airship with an altitude indicator.

20. The method of capturing wind energy of claim 19 further comprising a step of tracking wind speed at said altitude with a wind speed indicator.

* * * * *